United States Patent
Sakr

(10) Patent No.: US 11,756,345 B2
(45) Date of Patent: Sep. 12, 2023

(54) PARTIAL SENSOR DATA SHARING FOR CONNECTED VEHICLES

(71) Applicant: TOYOTA MOTOR ENGINEERING & MANUFACTURING NORTH AMERICA, INC., Erlanger, KY (US)

(72) Inventor: Ahmed Hamdi Sakr, Mountain View, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 17/703,836

(22) Filed: Mar. 24, 2022

(65) Prior Publication Data

US 2022/0215698 A1 Jul. 7, 2022

Related U.S. Application Data

(63) Continuation of application No. 16/572,289, filed on Sep. 16, 2019, now Pat. No. 11,335,132.

(51) Int. Cl.

| | |
|---|---|
| G07C 5/00 | (2006.01) |
| G07C 5/08 | (2006.01) |
| G08G 1/0967 | (2006.01) |
| G08G 1/123 | (2006.01) |
| H04W 4/44 | (2018.01) |
| H04L 67/12 | (2022.01) |
| H04L 9/32 | (2006.01) |
| H04W 4/46 | (2018.01) |

(52) U.S. Cl.
CPC ............. *G07C 5/008* (2013.01); *G07C 5/085* (2013.01); *G08G 1/096783* (2013.01); *G08G 1/123* (2013.01); *H04L 9/3268* (2013.01); *H04L 67/12* (2013.01); *H04W 4/44* (2018.02); *H04W 4/46* (2018.02); *H04L 2209/84* (2013.01)

(58) Field of Classification Search
CPC .. G07C 5/008; G07C 5/085; G08G 1/096783; G08G 1/123; H04L 9/3268; H04L 67/12; H04L 2209/84; H04W 4/44; H04W 4/46
See application file for complete search history.

(56) References Cited

U.S. PATENT DOCUMENTS

| | | | |
|---|---|---|---|
| 11,335,132 B2 | 5/2022 | Sakr | |
| 2012/0136510 A1* | 5/2012 | Min | ........................ G01S 17/88 701/2 |
| 2015/0145995 A1* | 5/2015 | Shahraray | ............. H04W 4/021 348/148 |
| 2016/0028824 A1* | 1/2016 | Stenneth | ................. H04L 67/12 709/219 |
| 2016/0277513 A1* | 9/2016 | Kim | ...................... H04W 4/021 |
| 2016/0350601 A1* | 12/2016 | Grau | ....................... G06T 11/60 |

* cited by examiner

*Primary Examiner* — Hongmin Fan
(74) *Attorney, Agent, or Firm* — SEYFARTH SHAW LLP

(57) ABSTRACT

A method of partial sensor data sharing is described. The method includes detecting an occluded area relative to a receiver vehicle. The method also includes defining an area of interest (AoI) based on a traffic topology and state information of a selected sender vehicle. The method further includes transmitting the area of interest to the selected sender vehicle. The method also includes receiving a sensor data corresponding to the area of interest when the detected occluded area is within a sensor coverage area of the selected sender vehicle.

15 Claims, 10 Drawing Sheets

PARTIAL SENSOR DATA SHARING FOR CONNECTED VEHICLES

CROSS-REFERENCE TO RELATED APPLICATION

The present application is a continuation of U.S. patent application Ser. No. 16/572,289, filed Sep. 16, 2019, and titled "PARTIAL SENSOR DATA SHARING FOR CONNECTED VEHICLES," the disclosure of which is expressly incorporated by reference herein in its entirety.

BACKGROUND

Field

Certain aspects of the present disclosure generally relate to connected vehicle applications and, more particularly, to a system and method of partial sensor data sharing for connected vehicles.

Background

Connected vehicle applications enable support for intelligent transportation systems (ITS). In general, ITS are advanced applications integrating telecommunications, electronics, and information technologies to support connected vehicles. ITS applications apply transport engineering to plan, design, operate, maintain, and manage transport systems of a connected vehicle. In particular, these ITS applications provide improved user information and increased safety by coordinating "smarter" use of transport networks.

Connected vehicle applications support vehicle-to-vehicle (V2V) communications and vehicle-to-infrastructure (V2I) with wireless technology. For example V2V communications use wireless signals to send information back and forth between other connected vehicles (e.g., location, speed, and/or direction). Conversely, V2I communications involve vehicle-to-infrastructure communications (e.g., road signs or traffic signals), generally involving vehicle safety issues. For example, V2I communications may request traffic information from a traffic management system to determine best possible routes. V2V and V2I applications for connected vehicles dramatically increase automotive safety by transforming vehicle operation.

The amount of sensor (radars, cameras, LiDAR, etc.) data generated by connected vehicle applications is growing exponentially due to an increased number of connected vehicles. This data may be shared with other vehicles (e.g., vehicle-to-vehicle (V2V) communication) and/or the infrastructure network (vehicle-to-infrastructure (V2I) communication). Unfortunately, the capacity of the communication links is limited. In addition, sharing a huge amount of data is costly and will cause channel congestion in the wireless network, which in turn increases the transmission time (or delay), and some data might even be lost.

SUMMARY

A method of partial sensor data sharing is described. The method includes defining an area of interest (AoI) based on a traffic topology and state information of a selected sender vehicle. The method also includes transmitting the area of interest to the selected sender vehicle. The method further includes sharing, by the selected sender vehicle, a sensor data corresponding to the area of interest when the area of interest is within a sensor coverage area of the selected sender vehicle.

A system for partial sensor data sharing from a selected sender vehicle is described. The system includes a sensor module. The system also includes a mobile unit communication module coupled to the sensor module. The system further includes a controller configured to share sensor data corresponding to a received area of interest through the mobile unit communication module. The controller is configured to share the sensor data when the received area of interest is within a sensor coverage area of the sensor module of the selected sender vehicle.

A non-transitory computer-readable medium having program code recorded thereon for partial sensor data sharing is described. The program code is executed by a processor and includes program code to define an area of interest (AoI) based on a traffic topology and state information of a selected sender vehicle. The non-transitory computer-readable medium also includes program code to transmit the area of interest to the selected sender vehicle. The non-transitory computer-readable medium further includes program code to share, by the selected sender vehicle, a sensor data corresponding to the area of interest when the area of interest is within a sensor coverage area of the selected sender vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
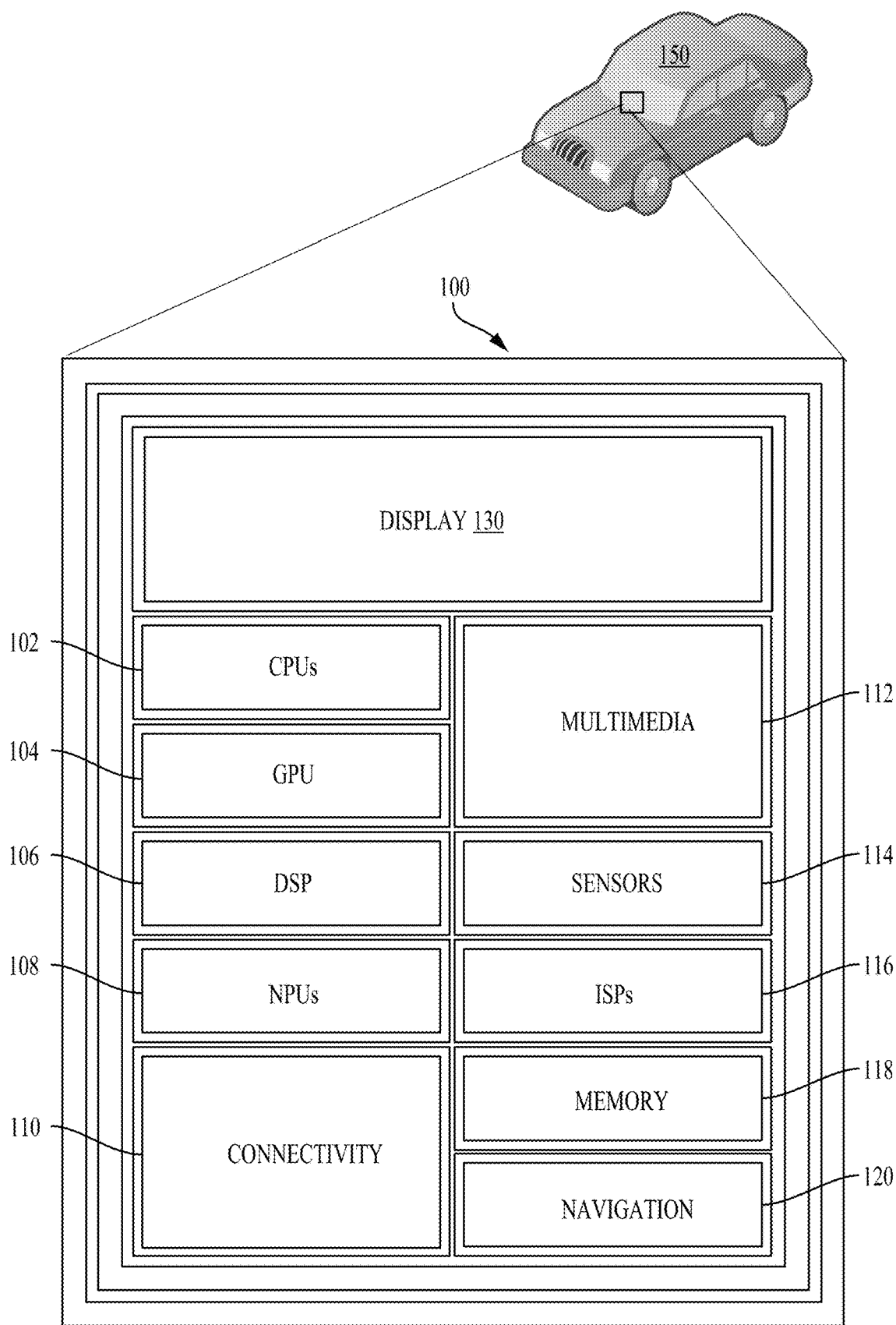
FIG. 1 illustrates an example implementation of designing a system using a system-on-a-chip (SOC) for partial sensor data sharing of connected vehicles, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

The amount of sensor data generated by connected vehicles is growing exponentially. This data may be shared with other vehicles (e.g., using vehicle-to-vehicle (V2V) communication) as well as infrastructure networks (e.g., using vehicle-to-infrastructure (V2I) communication). Unfortunately, the capacity of the communication links is limited. In addition, sharing a huge amount of data is costly and causes channel congestion in the wireless network. This channel congestion increases the transmission time (or delay), and some data may be lost.

Aspects of the present disclosure consider the problem of selecting an appropriate amount of sensor data shared by a connected vehicle, while saving wireless network resources. In this aspect of the present disclosure, connected vehicles and/or the infrastructure/cloud network exchange areas of interest by a corresponding transmitter. A shared amount of data is limited by sending partial sensor data (e.g., limited to areas of interest). Limiting shared data by sending partial sensor data reduces the required bandwidth, the transmission delay, channel congestion, and the overall cost of a connected vehicle system.

The present disclosure provides partial sensor data sharing by allowing vehicles and/or the infrastructure network to intelligently select the parts of unprocessed/raw sensor data of interest. This partial sensor data is shared by a sender vehicle by limiting transmissions to designated areas of interest. Sharing partial sensor data, therefore, limits the amount of data transmitted in a connected vehicle network. In addition, the receiving vehicles and/or infrastructure network have access to unprocessed sensor data for these areas of interest. Access to the unprocessed sensor data means the receiving vehicles and/or infrastructure network are not bound by the accuracy of the sender vehicle's algorithms of detecting objects and events.

In this configuration, each vehicle has the option of identifying important parts of the data. Similarly, sharing of redundant parts of the data (e.g., already acquired from the vehicle's own sensors or other vehicles), or unimportant parts of the data (e.g., not relevant to the intended route of the vehicle) is avoided. Aspects of the present disclosure may restrict the sharing of sensor data to a certain timeslot(s), as well as the amount of data shared during the certain timeslot(s). In addition, the present disclosure may restrict the time of data transmission to when the area of interest is within the sensor coverage of the sender vehicle. The amount of shared data is generally limited to the areas of interest designated by the intended receiver. Data compression techniques at the sender vehicle may further enhance the performance of the present disclosure. The present disclosure may reduce the amount of processed sensor data sharing, as desired.

FIG. 1 illustrates an example implementation of the aforementioned system and method for a partial sensor data sharing system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include code for partial sharing of sensor data regarding an area of interest (AoI) in an image captured by the sensor processor 114. The instructions loaded into a processor (e.g., CPU 102) may also include code for planning and control (e.g., intention prediction of the connected vehicle) in response to partial sharing of sensor data captured by a sender vehicle regarding AoI in the image captured by the sensor processor 114.

Figure 2:
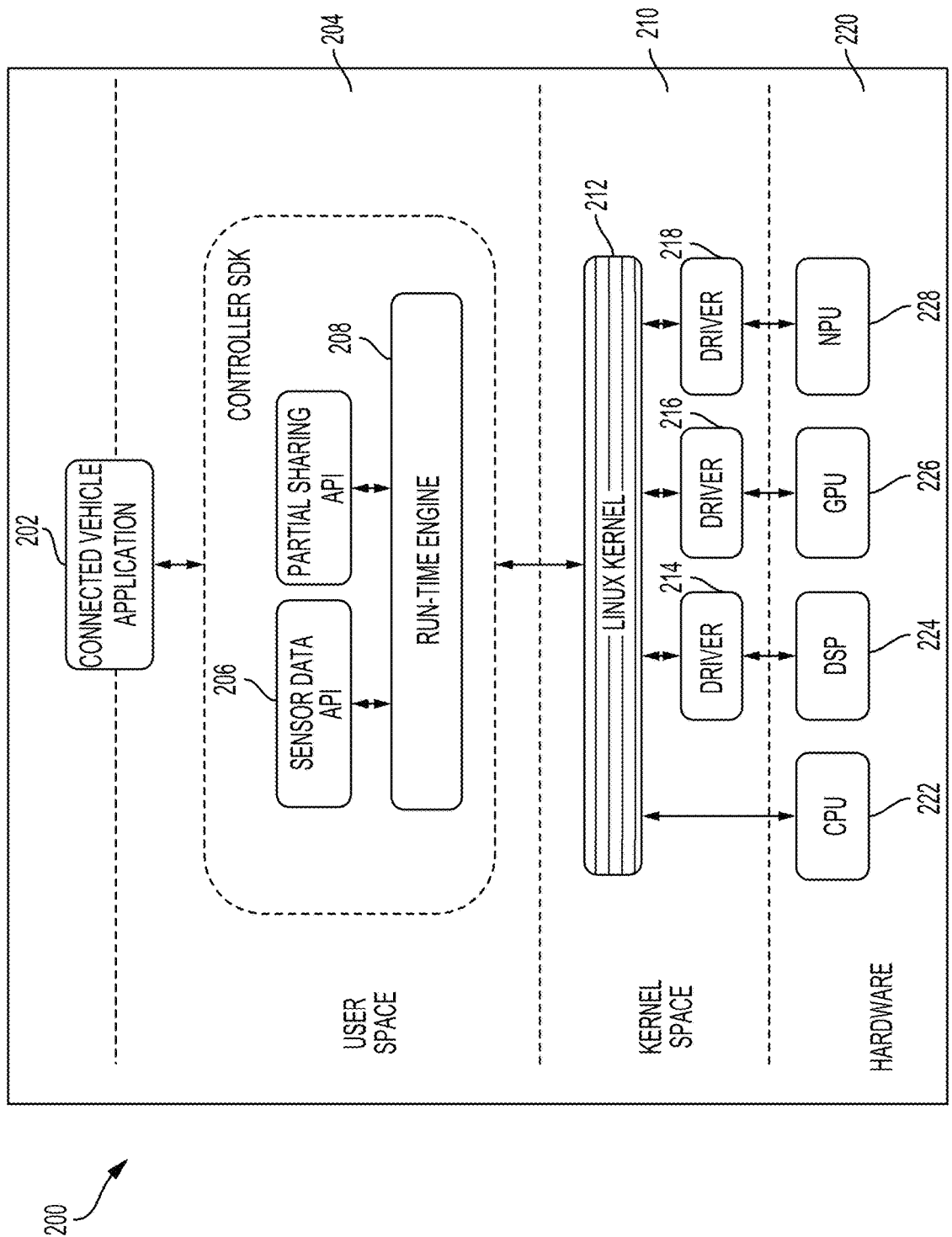
FIG. 2 is a block diagram illustrating a software architecture that may modularize functions for partial sensor data sharing for connected vehicles, according to aspects of the present disclosure.

FIG. 2 is a block diagram illustrating a software architecture 200 that may modularize functions for planning and control of an autonomous agent for partial data sharing among connected vehicles, according to aspects of the present disclosure. Using the architecture, a connected vehicle application 202 may be designed such that it may cause various processing blocks of an SOC 220 (for example a CPU 222, a DSP 224, a GPU 226, and/or an NPU 228) to perform supporting computations during run-time operation of the connected vehicle application 202.

The connected vehicle application 202 may be configured to call functions defined in a user space 204 that may, for example, provide for partial sensor data sharing among connected vehicles. The connected vehicle application 202 may make a request to compile program code associated with a library defined in a sensor data application programming interface (API) 206 to perform partial sensor data sharing.

A run-time engine 208, which may be compiled code of a runtime framework, may be further accessible to the connected vehicle application 202. The connected vehicle application 202 may cause the run-time engine 208, for example, to take actions for partial sharing of sensor data among connected vehicles. When an area of interest is detected within a predetermined distance of a sender connected vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
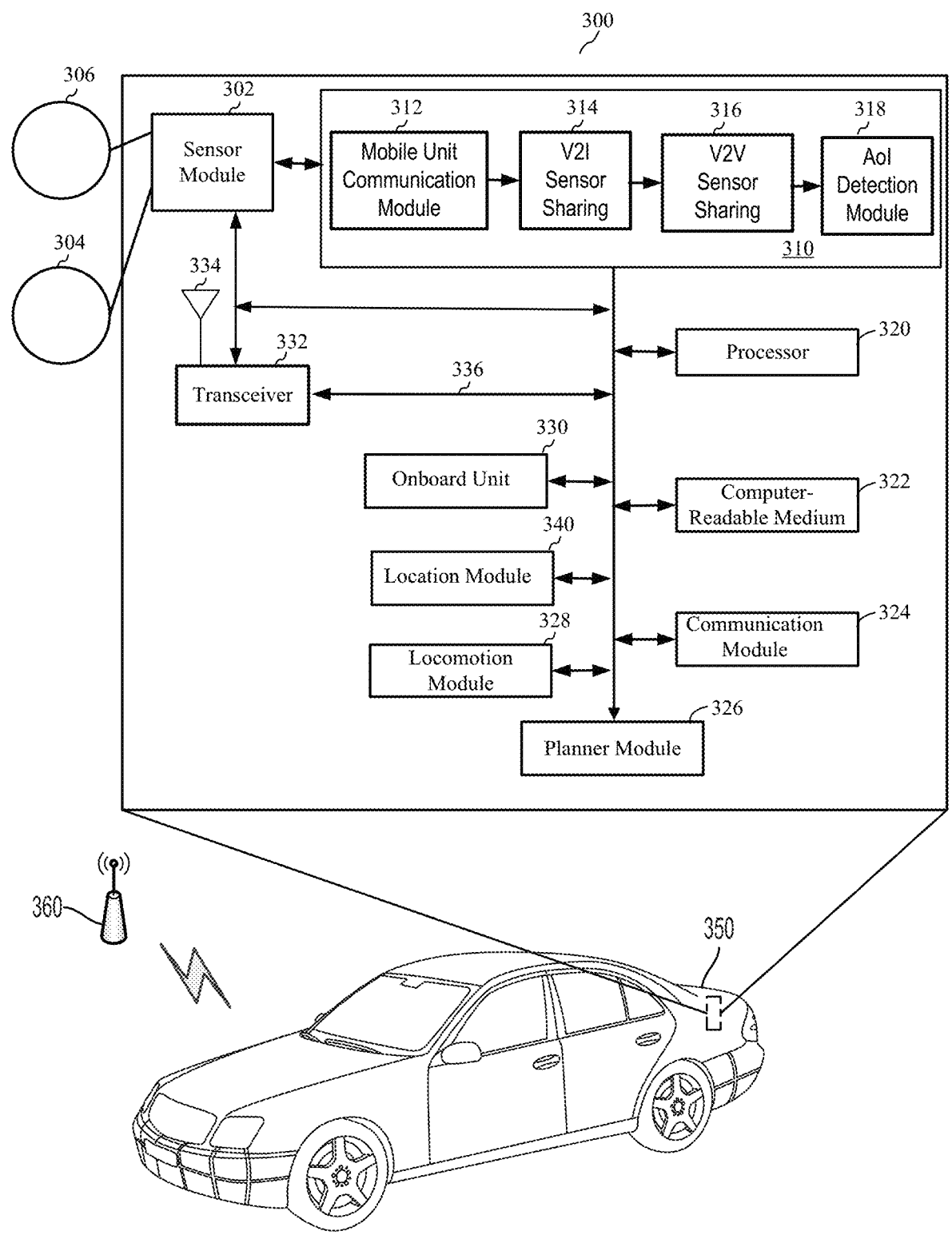
FIG. 3 is a diagram illustrating an example of a hardware implementation of a system for partial sensor data sharing among connected vehicles, according to aspects of the present disclosure.

FIG. 3 is a diagram illustrating an example of a hardware implementation for a partial sensor data sharing system 300, according to aspects of the present disclosure. The partial sensor data sharing system 300 may be configured to limit an amount of sensor data shared among connected vehicles and/or an infrastructure network. The partial sensor data sharing system 300 may be a component of a vehicle, a robotic device, or other device. For example, as shown in FIG. 3, the partial sensor data sharing system 300 is a component of a car 350. Aspects of the present disclosure are not limited to the partial sensor data sharing system 300 being a component of the car 350. Other devices, such as a bus, motorcycle, or other like vehicle, are also contemplated for using the partial sensor data sharing system 300. The car 350 may be autonomous, semi-autonomous, or simply a connected vehicle.

The partial sensor data sharing system 300 may be implemented with an interconnected architecture, represented generally by an interconnect 336. The interconnect 336 may include any number of point-to-point interconnects, buses, and/or bridges depending on the specific application of the partial sensor data sharing system 300 and the overall design constraints. The interconnect 336 links together various circuits including one or more processors and/or hardware modules, represented by a sensor module 302, a connected vehicle module 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The partial sensor data sharing system 300 includes a transceiver 332 coupled to the sensor module 302, the connected vehicle module 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may transmit partial sensor data using V2I communication as well as V2V communication from the connected vehicle module 310 to connected vehicles within the vicinity of the car 350.

The partial sensor data sharing system 300 includes the processor 320 coupled to the computer-readable medium 322. The processor 320 performs processing, including the execution of software stored on the computer-readable medium 322 to provide functionality according to the disclosure. The software, when executed by the processor 320, causes the partial sensor data sharing system 300 to perform the various functions described for limiting an amount of sensor data shared by a connected vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the connected vehicle module 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, a selected portion of the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 340 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the partial sensor data sharing system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The partial sensor data sharing system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The connected vehicle module 310 may be in communication with the sensor module 302, the processor 320, the computer-readable medium 322, the communication module 324, the planner module 326, the locomotion module 328, the location module 340, the onboard unit 330, and the transceiver 332. In one configuration, the connected vehicle module 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the connected vehicle module 310 may receive sensor data directly from the first sensor 306 and the second sensor 304 to determine, for example, to share unprocessed sensor data relative to a specified area of interest (AoI).

As shown in FIG. 3, the connected vehicle module 310 includes a mobile unit communication module 312, a vehicle-to-infrastructure (V2I) sensor sharing module 314, a vehicle-to-vehicle (V2V) sensor sharing module 316, and an area of interest (AoI) select/detect module 318. The mobile unit communication module 312, the vehicle-to-infrastructure (V2I) sensor sharing module 314, the vehicle-to-vehicle (V2V) sensor sharing module 316, and the area of interest (AoI) select/detect module 318 may be components of a same or different connected vehicle module 310. The connected vehicle module 310 receives a data stream from the first sensor 306 and/or the second sensor 304. The data stream may include a 2D RGB image from the first sensor 306 and LiDAR data points from the second sensor 304. The data stream may include multiple frames, such as image frames.

The mobile unit communication module 312 may be configured to communicate with other connected vehicles within a proximity of the car 350. For example, the car 350 may receive a selected area or interest (AoI) from a connected vehicle. The AoI is processed by the AoI select/detect module 318 to establish the AoI for which shared data is confined. During operation of the car 350, the AoI select/detect module 318 may identify the selected AoI within a vicinity of the car 350. In this example, the V2V sensor sharing module 316 may share sensor data relative to the area of interest to a requesting connected vehicle. According to aspects of the present disclosure, in the example, the car 350 may be referred to as a sender vehicle and the requesting connected vehicle may be referred to as a receiver vehicle.

In aspects of the present disclosure, the V2I sensor sharing module 314 and the V2V sensor sharing module 316 may share either: (1) processed sensor data or (2) unprocessed/raw sensor data sharing. In the first configuration, a sender vehicle shares processed sensor data (such as position, size, type, and/or dynamics of surrounding vehicles, etc.). While sharing of processed sensor data significantly reduces the amount of data compared to the raw data share, this limits the benefits to other vehicles. For example, the accuracy of the processed data depends on the algorithms used at the sender vehicle. In the second configuration, unprocessed/raw sensor data is shared, and the receiving vehicles can leverage this unprocessed data for their application without any limitations. Unfortunately, this may increase network congestion and delay and incurs a huge cost for sharing this massive amount of sensor data.

Aspects of the present disclosure balance this tradeoff by allowing vehicles and/or an infrastructure network to intelligently select the parts of unprocessed/raw sensor data in which they are interested. That is, the shared sensor data from a sender vehicle is limited to transmissions of sensor data from the selected AoI. This will limit the amount of data transmitted in the network which reduces the cost, delay and congestion, and save network resources. At the same time, the receiver vehicles and/or infrastructure network has access to the unprocessed sensor data for the selected AoI. As a result, the receiver vehicle (and/or the infrastructure network) is not bound by the accuracy of the sender vehicle's algorithms of detecting objects and events.

In this configuration, each vehicle has the option of identifying important parts of the data. Similarly, sharing of redundant parts of the data (e.g., already acquired from the vehicle's own sensors or other vehicles), or unimportant parts of the data (e.g., not relevant to the intended route of the vehicle) is avoided. Aspects of the present disclosure may restrict the sharing of sensor data to a certain timeslot(s) as well as the amount of data shared during the certain timeslot(s). In addition, the present disclosure may restrict the time of data transmission to when the area of interest is within the coverage of the sender vehicle. The amount of shared data is generally limited to the areas of interest designated by the intended receiver. Data compression techniques at the sender vehicle may further enhance the performance of the present disclosure. The present disclosure may reduce the amount of processed sensor data sharing, as desired, as in FIGS. 4-9.

Figure 4:
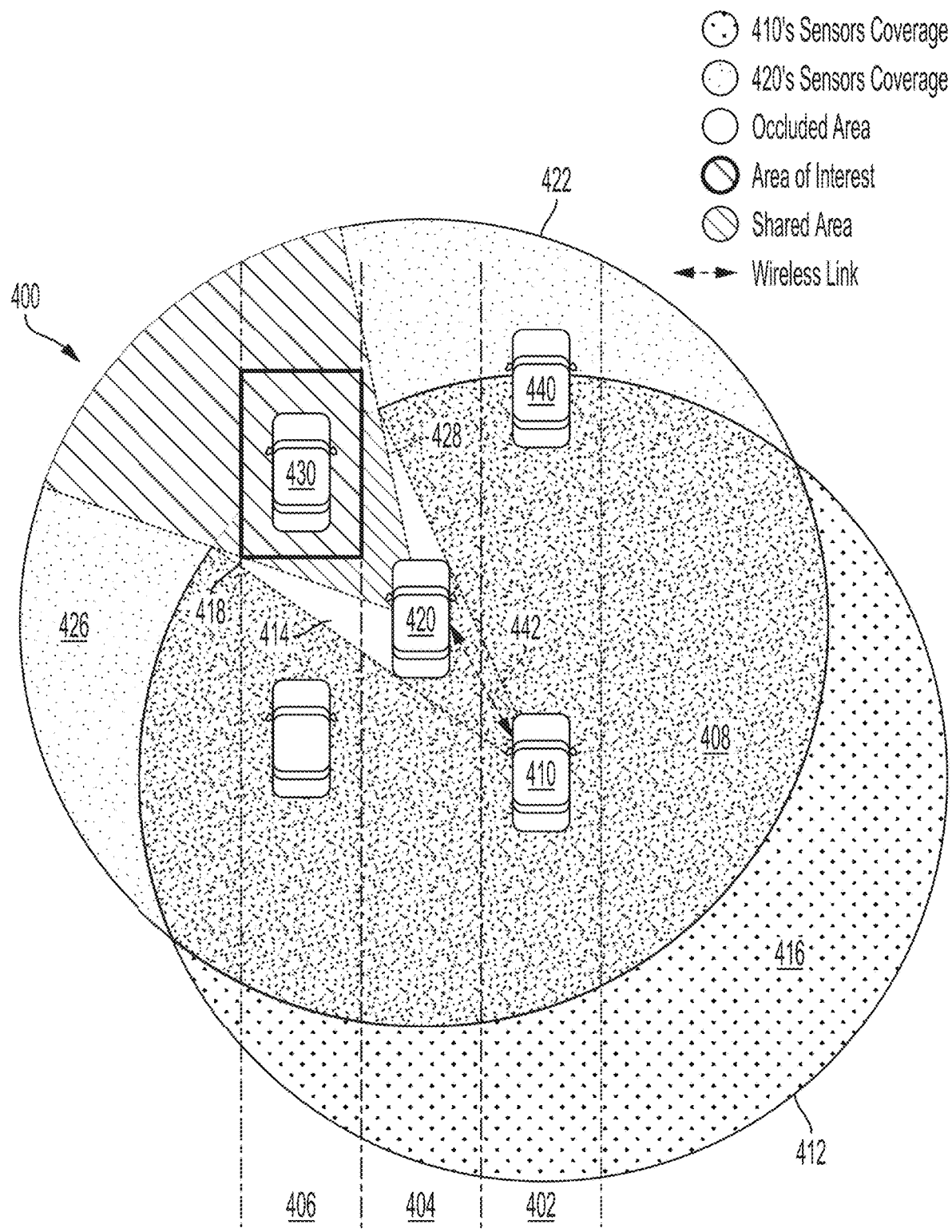
FIG. 4 is a diagram illustrating partial sharing of sensor data among connected vehicles, according to aspects of the present disclosure.

FIG. 4 is a diagram illustrating partial sharing of sensor data among connected vehicles, according to aspects of the present disclosure. In this example, a three-lane highway 400 is shown, including a first lane 402, a second lane 404, and a third lane 406. The first lane 402 includes a first connected vehicle 410, the second lane 404 includes a second connected vehicle 420, and the third lane 406 includes a third vehicle 430. Sensor coverage areas are also shown. In particular, the first connected vehicle 410 includes a first sensor coverage area 412, and the second connected vehicle 420 includes a second sensor coverage area 422. An overlapping coverage area 408, as well as a first non-overlapping area 416, and a second non-overlapping area 426 are shown.

In this aspect of the present disclosure, the first connected vehicle 410 and the second connected vehicle 420 are configured as shown in FIG. 3. That is, the first connected vehicle 410 and the second connected vehicle 420 are equipped with sensors (e.g., cameras, LiDAR, as shown in FIG. 3) that provide information about surrounding objects/events. In addition, the first connected vehicle 410 and the second connected vehicle 420 are equipped with communication units to exchange data about their state and surrounding traffic information with nearby connected vehicles or infrastructure/cloud network (see FIG. 3).

As shown in FIG. 4, both the first connected vehicle 410 and the second connected vehicle 420 can communicate with each other over a wireless link 442, while the third vehicle 430 is unconnected. Both the first connected vehicle 410 and the second connected vehicle 420 are equipped with a sensor array to detect nearby objects/events. In this example, the second connected vehicle 420 occludes the vision of the first connected vehicle 410, as shown by an occluded area 414. The existence of the occluded area 414 means the first connected vehicle 410 is unaware of the existence of the third vehicle 430. Therefore, the first connected vehicle 410 cannot detect the third vehicle 430. As described in FIG. 5, the first connected vehicle 410 performs a process to define an area of interest (AoI) 418 and discover the contents of the occluded area 414 within a sector 428 of the second sensor coverage area 422.

Figure 5:
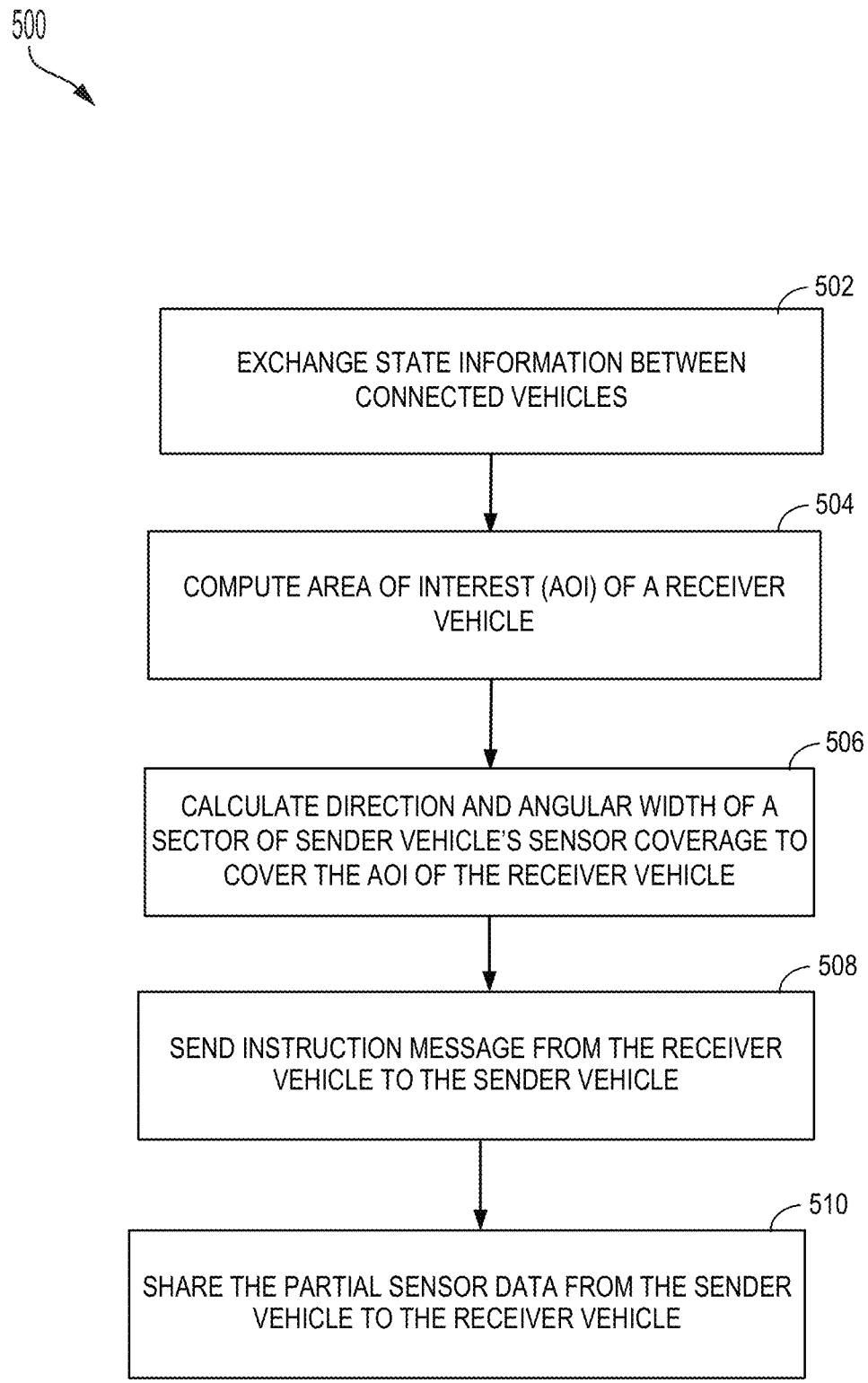
FIG. 5 is a flowchart illustrating a method for defining an area of interest (AoI) of a receiver vehicle to perform the partial sensor data sharing of FIG. 4, according to aspects of the present disclosure.

FIG. 5 is a flowchart illustrating a method 500 for defining an area of interest (AoI) of a receiver vehicle to perform the partial sensor data sharing of FIG. 4, according to aspects of the present disclosure. At block 502, state information is exchanged between connected vehicles. For example, as shown in FIG. 4, the first connected vehicle 410 and the second connected vehicle 420 exchange their state information to initiate discovery of contents of the occluded area 414. This state information may include, but is not limited to, a current position, a current speed, a current acceleration, and other like state information of the first connected vehicle 410 and the second connected vehicle 420. In this aspect of the present disclosure, the sector 428 of the second sensor coverage area 422 of the second connected vehicle 420 overlaps with the occluded area 414. As a result, the second connected vehicle 420 enables the first connected vehicle 410 to discover the contents of the AoI 418 (e.g., the third vehicle 430).

Referring again to FIG. 5, at block 504, a receiver vehicle computes an area of interest (AoI). As shown in FIG. 4, the first connected vehicle 410 (e.g., a receiver vehicle) uses the state information about its own position as well as a position of the second connected vehicle 420 to calculate the area of interest (or AoI). The AoI 418 may be defined according to a center, a width, a length, and a direction of the AoI. For example, the AoI 418 of the first connected vehicle 410 is defined to cover the occluded area 414.

TABLE 1

Instruction Message Format

| Timestamp | Direction | Width |
| --- | --- | --- |

Referring again to FIG. 5, at block 506, a direction and an angular width of a sector of the sensor coverage of the sender vehicle are calculated to cover the AoI of the receiver vehicle. As shown in FIG. 4, a sector 428 of the second sensor coverage area 422 of the second connected vehicle 420 is calculated to cover the AoI 418 enclosing the third vehicle 430. At block 508, an instruction message is sent from the receiver vehicle to the sender vehicle. The instruction message may be formatted as shown in Table 1. In this example, the instruction message includes a timestamp, a direction, and a width of the area of interest (e.g., AoI 418). At block 510, partial sensor data is shared between the sender vehicle and the receiver vehicle when the AoI is within the sensor coverage area of the sender vehicle.

As shown in FIG. 4, partial sensor data covering the AoI 418 is provided from the second connected vehicle 420 to the first connected vehicle 410. This partial sensor data shows the contents of the occluded area 414 (e.g., third vehicle 430) to the first connected vehicle 410. According to aspects of the present disclosure, the blocks of the method 500 may be repeated every timeslot and may vary based on decisions and interests of the receiver vehicle (e.g., the first connected vehicle 410). According to one aspect of the present disclosure, the sender vehicle may perform blocks 504, 506, and 508 on behalf of the receiver vehicle, as the sender vehicle already knows the position of the receiver vehicle and can estimate the AoI 418. As should be noted, the AoI 418 is not limited to the occluded area of the receiver vehicle. For example, the first connected vehicle 410 (e.g., receiver vehicle) may be interested in increasing its detection accuracy of a different object. Detection accuracy may be improved by requesting the second connected vehicle 420 (e.g., sender vehicle) to share sensor data for the different object (e.g., the vehicle 440 ahead of the first connected vehicle 410).

FIGS. 6A-6D are diagrams illustrating partial sensor data sharing between a receiver vehicle 610 and a sender vehicle 620 for a dynamic area of interest (AoI 618), according to aspects of the present disclosure. In this example, a highway 600 is shown, including a first lane 602, a second lane 604, and a third lane 606. The first lane 602 includes a receiver vehicle 610, the second lane 604 includes a sender vehicle 620, and the third lane 606 includes the AoI 618. A sensor coverage area 622 of the sender vehicle 620, as well as a dynamic sector 628 of the sensor coverage area 622 are also shown. In this example, the AoI 618 is moving. As a result, the dynamic sector 628 of the sensor coverage area 622 of the sender vehicle 620 enables coverage of the AoI 618.

Figure 6A:
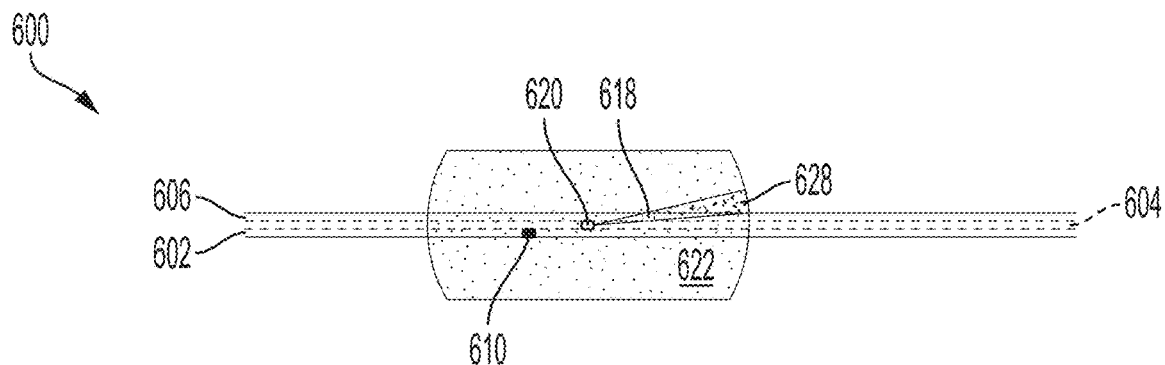
FIGS. 6A-6D are diagrams illustrating partial sensor data sharing between a receiver vehicle and a sender vehicle for a dynamic area of interest (AoI), according to aspects of the present disclosure.

As shown in FIG. 6A, the sender vehicle 620 as well as the AoI 618 are initially ahead of the receiver vehicle 610, with the AoI 618 captured by the dynamic sector 628 and shared with the receiver vehicle 610.

Figure 6B:
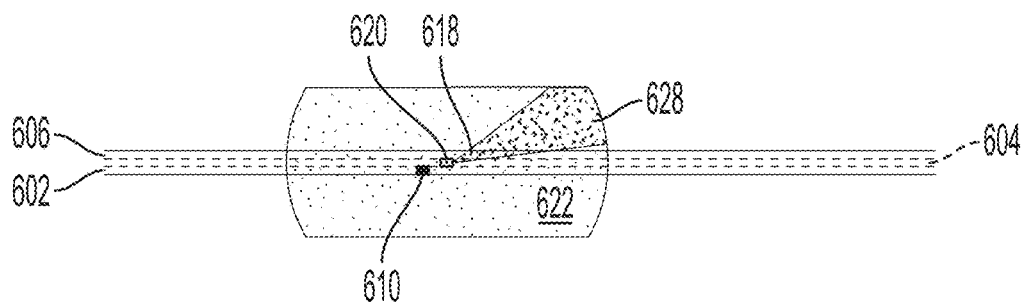

As shown in FIG. 6B, the sender vehicle 620 as well as the AoI 618 are still ahead of the receiver vehicle 610; however, the sender vehicle 620 is about to pass the AoI 618. As a result, the dynamic sector 628 of the sender vehicle 620 expands and is shared with the receiver vehicle 610.

Figure 6C:
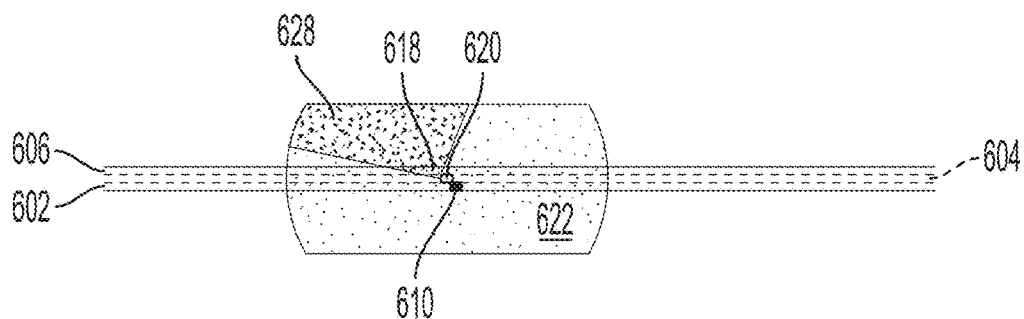

As shown in FIG. 6C, the receiver vehicle 610 passes the sender vehicle 620, which has also passed the AoI 618. As a result, the dynamic sector 628 of the sender vehicle 620 is further expanded and the partial sensor data is shared with the receiver vehicle 610.

Figure 6D:
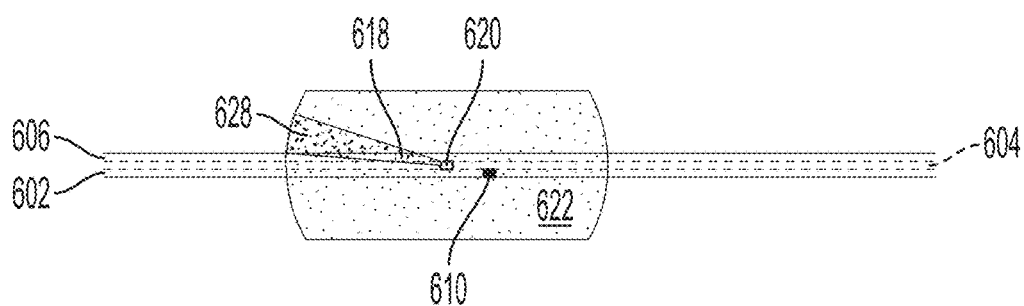

As shown in FIG. 6D, the receiver vehicle 610 and the sender vehicle 620 are further away from the AoI 618. As a result, the dynamic sector 628 of the sender vehicle 620 is reduced and the partial sensor data is shared with the receiver vehicle 610. In this example, the AoI 618 may be a stranded vehicle on the highway 600.

Figure 7:
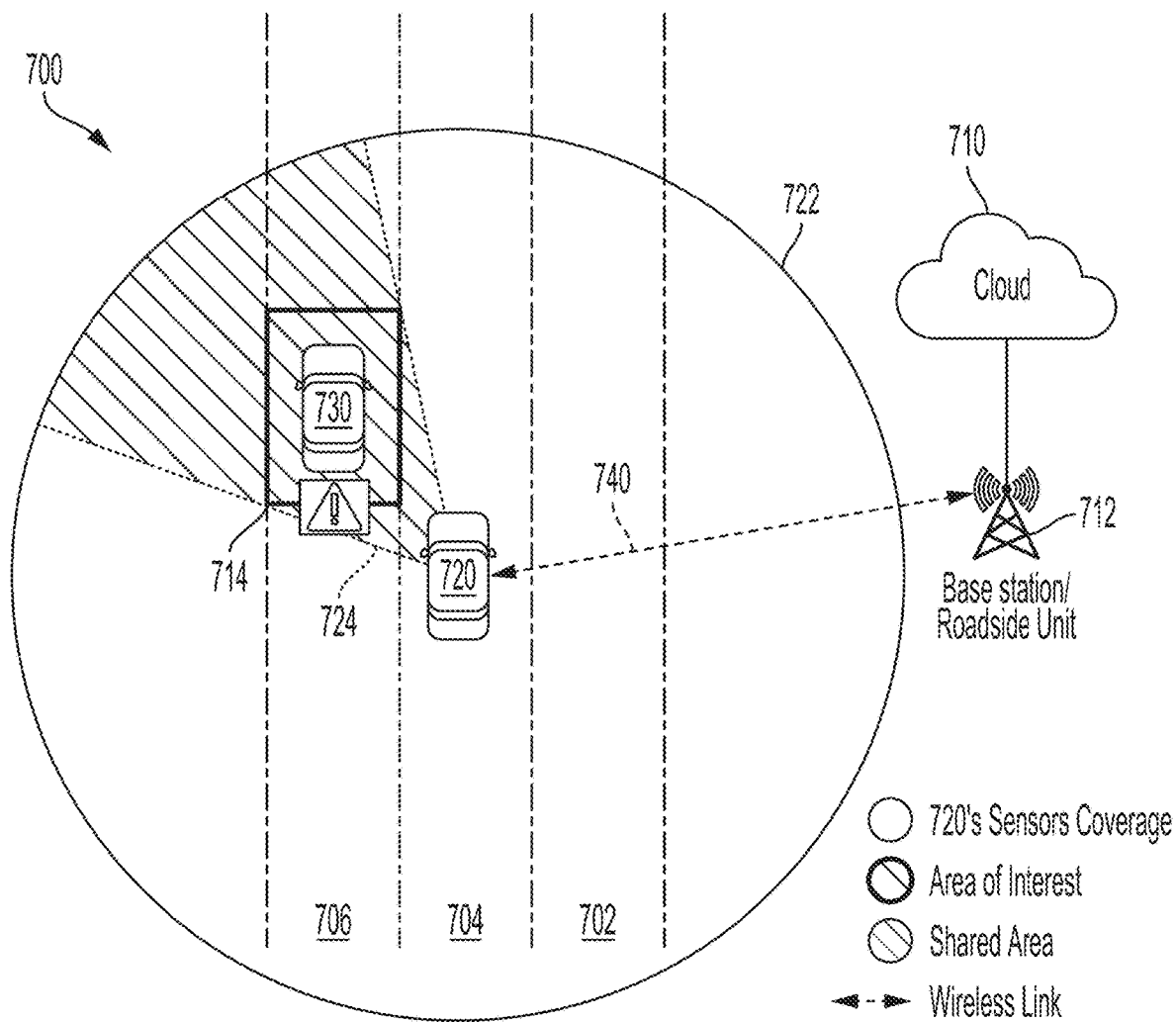
FIG. 7 is a diagram illustrating partial sharing of sensor data among a connected vehicle and an infrastructure network, according to aspects of the present disclosure.

FIG. 7 is a diagram illustrating partial sharing of sensor data among a connected vehicle and an infrastructure network, according to aspects of the present disclosure. In this example, a three-lane highway 700 is shown, including a first lane 702, a second lane 704, and a third lane 706. The first lane 702 is empty, the second lane 704 includes a sender vehicle 720, and the third lane 706 includes an unknown lane obstruction 730. A sensor coverage area 722 of the sender vehicle 720 is shown. In this example, a sector 724 of the sensor coverage area 722 of the sender vehicle 720 captures an area of interest (AoI) 714.

In this example, the sender vehicle 720 can communicate with an infrastructure network 710 (e.g. cloud network) through a roadside unit (RSU) or a base station (e.g., RSU 712). An RSU plays a key role in V2I (vehicle-to-infrastructure) services, as shown in FIG. 7. RSUs are generally installed in fixed locations or physically integrated with existing infrastructure (e.g., traffic lights). The RSU 712 provides the infrastructure network 710 with access to the sender vehicle 720 over the wireless link 740.

In this example, the sender vehicle 720 is also equipped with a sensor array to detect nearby objects/events. The infrastructure network 710 decides that there may be an event on the road at a specific/fixed area (e.g., AoI 714). This event could be a collision, lane obstruction, which is shown as an unknown lane obstruction 730. In this example, the unknown lane obstruction 730 is a disabled vehicle. In this aspect of the present disclosure, the infrastructure network 710 undertakes a process of discovering the contents of the AoI 714 with the help of the sender vehicle 720, for example, as shown in FIG. 8.

Figure 8:
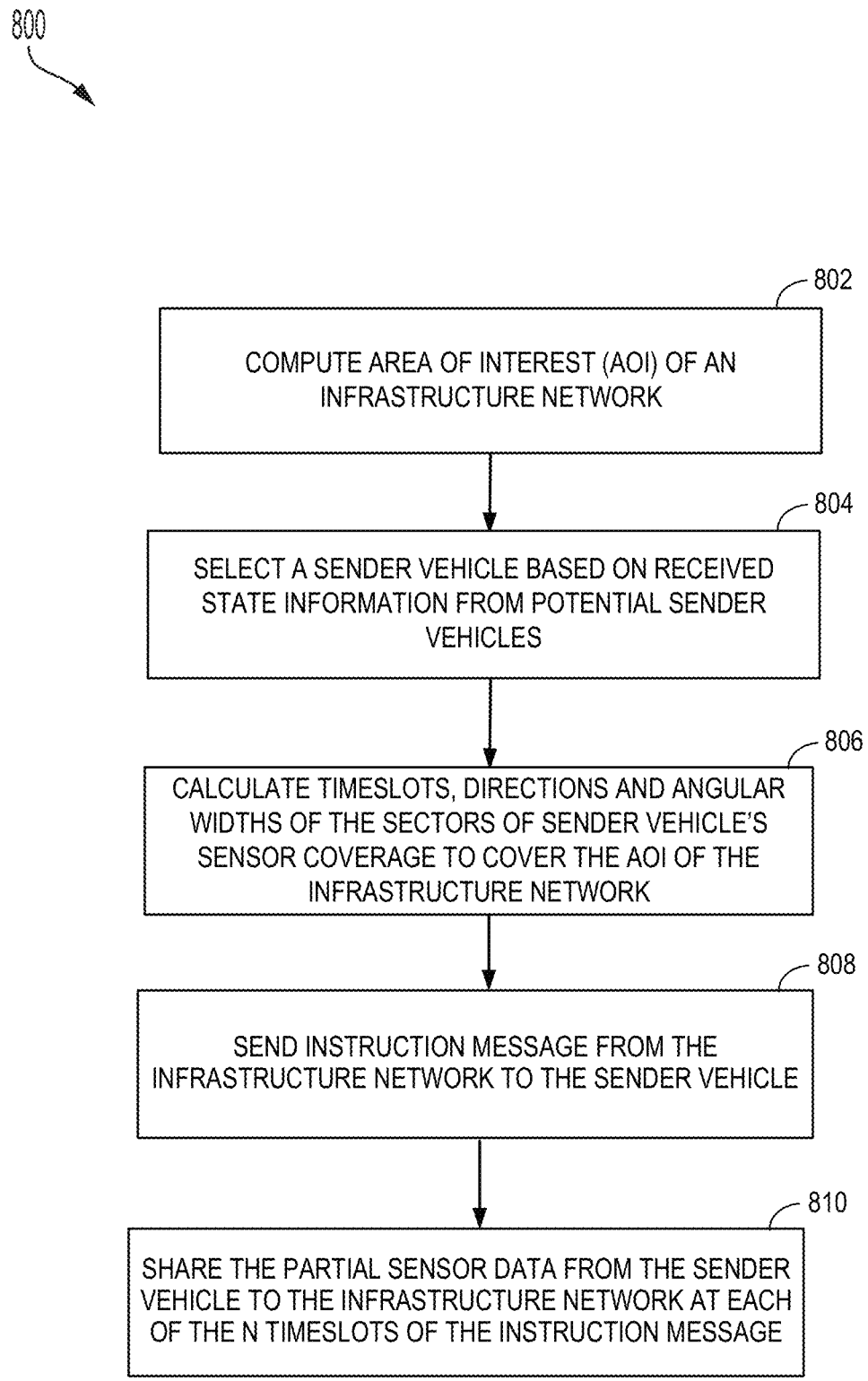
FIG. 8 is a flowchart illustrating a method for defining an area of interest (AoI) of an infrastructure network to perform the partial sensor data sharing of FIG. 7, according to aspects of the present disclosure.

FIG. 8 is a flowchart illustrating a method 800 for defining an area of interest (AoI) of an infrastructure network to perform the partial sensor data sharing of FIG. 7, according to aspects of the present disclosure. At block 802, an infrastructure network computes an AoI. As shown in FIG. 7, the infrastructure network 710 calculates the area of interest (or AoI 714). The AoI 714 may be defined according to a center, a width, a length, and a direction of the AoI. For example, the AoI 714 of the infrastructure network 710 is defined to cover the unknown lane obstruction 730. In this aspect of the present disclosure, a sector 724 of the sensor coverage area 722 of the sender vehicle 720 overlaps with the AoI 714 of the infrastructure network 710. As a result, the sender vehicle 720 enables the infrastructure network 710 to discover the contents of the AoI 714 (e.g., the unknown lane obstruction 730).

Referring again to FIG. 8, at block 804, a sender vehicle is selected based on state information received from potential sender vehicles, which may be referred to as a selected sender vehicle. For example, as shown in FIG. 7, the sender vehicle 720 is selected by the infrastructure network 710 based on a predicted trajectory of the sender vehicle 720 relative to the AoI 714 to enable discovery of the unknown lane obstruction 730. This state information may include, but is not limited to, a current position, a current speed, a current acceleration, and other like state information of the sender vehicle 720. At block 806, timeslots, directions, and angular widths of sectors of the sensor coverage of the sender vehicle are calculated to cover the AoI of the infrastructure network over N timeslots as the sender vehicle moves.

TABLE 2

Infrastructure Instruction Message Format One

| Time-stamp | Start time of data sharing | No. of time-slots (N) | Direction $1^{st}$ timeslot | Width $1^{st}$ timeslot | . . . . . . | Direction $N^{th}$ timeslot | Width $N^{th}$ timeslot |
|---|---|---|---|---|---|---|---|

As shown in FIG. 7, a sector 724 of the sensor coverage area 722 of the sender vehicle 720 is calculated to cover the AoI 714 enclosing the unknown lane obstruction 730 during a timeslot. It should be recognized that sectors of the sensor coverage area 722 of the sender vehicle 720 are calculated to cover the AoI 714 of the infrastructure network 710 over N timeslots as the sender vehicle 720 moves. At block 808, an instruction message is sent from the infrastructure network to the sender vehicle. The instruction message may be formatted as shown in Table 2. In this example, the instruction message includes a timestamp, a start time of data sharing, a number of timeslots (N), a direction of $1^{st}$ timeslot, a width of the $1^{st}$ timeslot, a direction of $N^{th}$ timeslot, and a width of the $N^{th}$ timeslot. At block 810, partial sensor data is shared between the sender vehicle and the infrastructure network at each of the N timeslots of the instruction message.

As shown in FIG. 7, partial sensor data covering the AoI 714 is provided from the sender vehicle 720 to the infrastructure network 710 at each of the N timeslots requested by the infrastructure network 710 in the instruction message. This partial sensor data shows the contents of the AoI 714 (e.g., the unknown lane obstruction 730) to the infrastructure network 710. As should be noted, the infrastructure network 710 can calculate the trajectories of the sender vehicle 720 ahead of time and before the AoI 714 is within the coverage of the sender vehicle 720. The infrastructure network 710 may also decide that other vehicles passing by the AoI 714 may or may not share their sensor data to save the network resources.

TABLE 3

Infrastructure Instruction Message Format Two

| Time-stamp | Start position for data sharing | End position for data sharing | Center of AoI | Width of AoI | Length of AoI | Direction of AoI |
|---|---|---|---|---|---|---|

According to one aspect of the present disclosure, the sender vehicle 720 may perform a portion of the blocks of the method 800 on behalf of the infrastructure network 710. For example, using the AoI 714 computed by the infrastructure network 710, the sender vehicle 720 computes a portion of the blocks of the method 800, assuming the sender vehicle 720 possesses sufficient processing power. For example, the infrastructure network 710 calculates the AoI 714 according to a center, a width, a length, and a direction of the AoI 714. The infrastructure network 710 selects the sender vehicle 720 by sending an instruction message to the sender vehicle 720. The instruction message may be formatted as shown in Table 3.

In this aspect of the present disclosure, the instruction message includes a timestamp, a start time of data sharing, an end position for data sharing, a center of the AoI 714, a width of the AoI 714, a length of the AoI 714, and a direction of the AoI 714. In response to the instruction message, the sender vehicle 720 use the AoI 714 and its own state information to calculate a series of timeslots (N), directions, and angular widths of the sectors to cover the AoI 714 over the N timeslots as sender vehicle 720 moves. In this configuration, the sender vehicle 720 shares the partial sensor data at every timeslot according to the series of calculated sectors corresponding to the N timeslots.

FIGS. 9A-9E are diagrams illustrating partial sensor data sharing between an infrastructure network (not shown) and a sender vehicle 920 for a fixed area of interest (fixed AoI 914), according to aspects of the present disclosure. In this example, a highway 900 is shown, including a first lane 902, a second lane 904, and a third lane 906. The first lane 902 is empty, the second lane 604 includes a sender vehicle 920, and the third lane 606 includes the fixed AoI 914. A sensor coverage area 922 of the sender vehicle 920, as well as a dynamic sector 924 of the sensor coverage area 922 are also shown. In this example, the dynamic sector 924 of the sensor coverage area 922 of the sender vehicle 920 enables coverage of the fixed AoI 914.

Figure 9A:
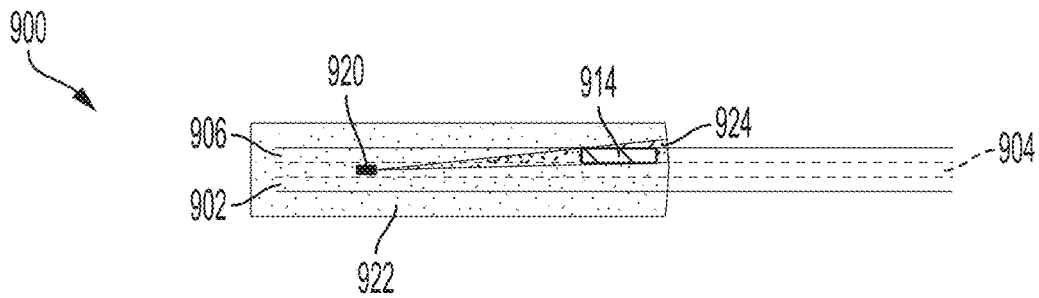
FIGS. 9A-9E are diagrams illustrating partial sensor data sharing between an infrastructure network (not shown) and a sender vehicle for a fixed area of interest (fixed AoI), according to aspects of the present disclosure.

As shown in FIG. 9A, the fixed AoI 914 is initially ahead of the sender vehicle 920, with the fixed AoI 914 captured by the dynamic sector 924 and shared with the infrastructure network (not shown).

Figure 9B:
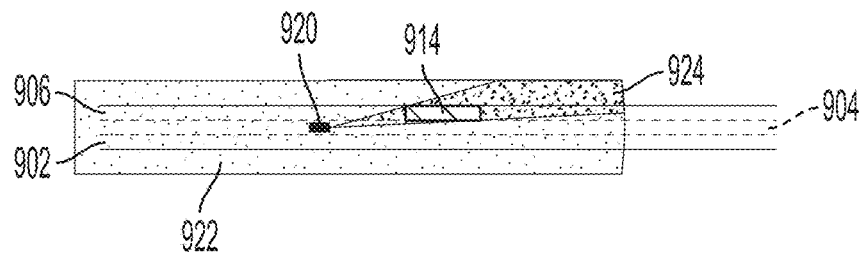

As shown in FIG. 9B, the fixed AoI 914 is still ahead of the sender vehicle 920; however, the sender vehicle 920 is about to reach the fixed AoI 914. As a result, the dynamic sector 924 of the sender vehicle 920 expands and is shared with the infrastructure network (not shown).

Figure 9C:
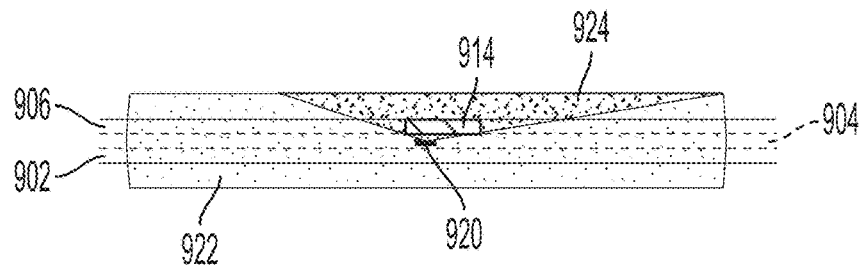

In FIG. 9C, sender vehicle 920 is even with the fixed AoI 914. As a result, the dynamic sector 924 of the sender vehicle 920 is further expanded and the partial sensor data is shared with the infrastructure network (not shown).

Figure 9D:
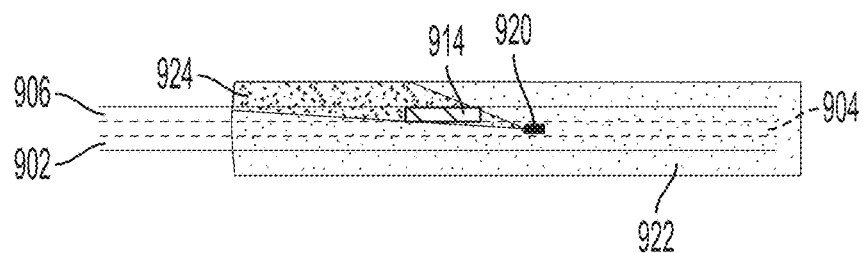

In FIG. 9D, the sender vehicle 920 has passed the fixed AoI 914. As a result, the dynamic sector 924 of the sender vehicle 920 is reduced and the partial sensor data is shared with the infrastructure network (not shown). In this example, the amount of shared partial sensor data is reduced relative to the example shown in FIG. 9C.

Figure 9E:
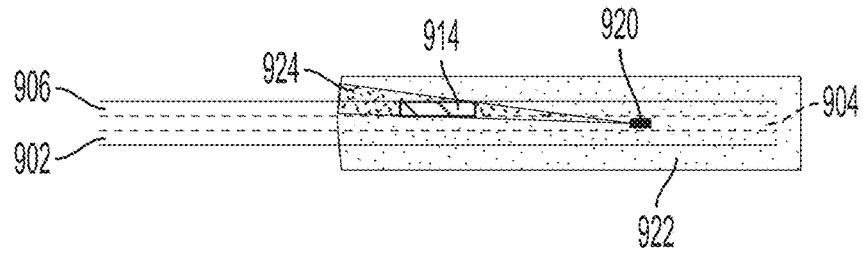

In FIG. 9E, the sender vehicle 920 is further away from the fixed AoI 914. As a result, the dynamic sector 924 of the sender vehicle 920 is further reduced and the partial sensor data is shared with the infrastructure network (not shown). In this example, the amount of shared partial sensor data is further reduced relative to the example shown in FIG. 9D. In this example, the fixed AoI 914 may be a stranded vehicle on the highway 900.

Aspects of the present disclosure intelligently limit the amount of shared sensor data sharing by: (1) defining an area of interest based on the topology of a road and a type of data sharing application (e.g., a traffic topology); and (2) defining a time window for data sharing. After defining the area of interest and time window, a sender vehicle shares specific sectors of the sensor coverage area, rather than sharing the entire sensor coverage data. Aspects of the present disclosure are flexible and applicable to vehicle-to-vehicle and vehicle-to-infrastructure communications. Various use cases are suitable for any scenario such as intersections, highways, urban areas, etc. This aspect of the present disclosure significantly reduces the amount of (redundant) data shared over the wireless network which reduces the delay, cost.

According to further aspects of the present disclosure, in an infrastructure mode, a sender vehicle communicate with an infrastructure network (e.g. cloud network) through a roadside unit (RSU) or a base station. The RSU provides the infrastructure network with access to the sender vehicle over a wireless link 740. In the infrastructure mode, there may be an event on the road at a specific/fixed area. This event could be a collision, lane obstruction, or other like unknown lane obstruction. Partial sharing of sensor data of the specific/fixed area from a selected sender vehicle to the infrastructure network can confirm the situation and request assistance to clear the unknown lane obstruction for reducing congestion.

Figure 10:
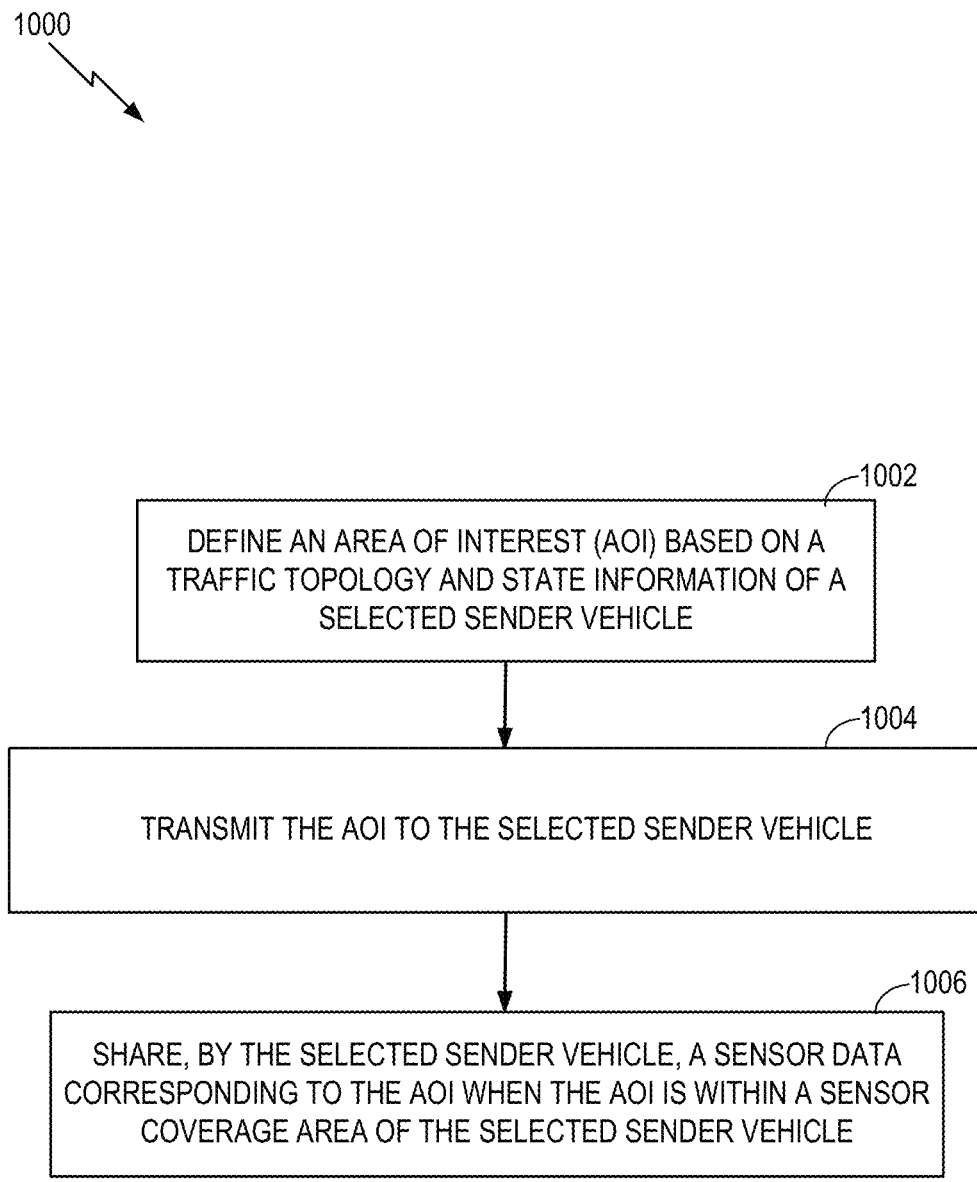
FIG. 10 is a flowchart illustrating a method for partial sensor data sharing, according to aspects of the present disclosure.

FIG. 10 is a flowchart illustrating a method for partial sensor data sharing, according to aspects of the present disclosure. A blocks 1002, an area of interest (AoI) is defined based on a traffic topology and state information of a selected sender vehicle. For example, shown in FIG. 5, the first connected vehicle 410 performs a process to define an area of interest (AoI) 418 and discovers the contents of the occluded area 414 within a sector 428 of the second sensor coverage area 422. At block 1004, the area of interest is transmitted to the selected sender vehicle. At block 1006, a sensor data corresponding to the area of interest is shared by the selected sender vehicle when the area of interest is within a sensor coverage area of the selected sender vehicle. In some aspect of the present disclosure, the area of interest is composed of specific sections of the sensor coverage area of the selected sender vehicle In some aspects, the method 1000 may be performed by the SOC 100 (FIG. 1) or the software architecture 200 (FIG. 2) of the autonomous vehicle 150. That is, each of the elements of method 1000 may, for example, but without limitation, be performed by the SOC 100, the software architecture 200, or the processor (e.g., CPU 102) and/or other components included therein of the autonomous vehicle 150.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of partial sensor data sharing, the method comprising:
    detecting an occluded area relative to a receiver vehicle;
    defining an area of interest (AoI) encompassing the detected occluded area based on a traffic topology and state information of a selected sender vehicle;
    transmitting the area of interest to the selected sender vehicle; and
    receiving a sensor data corresponding to the area of interest when the detected occluded area is within a sensor coverage area of the selected sender vehicle.

2. The method of claim 1, further comprising:
    defining, by the receiver vehicle, the area of interest encompassing the detected occluded area; and
    setting, by the receiver vehicle, a time window for partial data sharing by the selected sender vehicle; and
    analyzing, by the receiver vehicle, the detected occluded area based on the sensor data corresponding to the area of interest.

3. The method of claim 1, in which the area of interest comprises specific sections of the sensor coverage area of the selected sender vehicle.

4. The method of claim 1, further comprising:
    defining, by an infrastructure network, the area of interest;
    selecting the selected sender vehicle based on received state information from potential sender vehicles;
    setting, by the infrastructure network, a time window for partial data sharing by the selected sender vehicle; and
    receiving, by the infrastructure network, the sensor data corresponding to the area of interest.

5. The method of claim 4, in which the infrastructure network receives the sensor data from the selected sender vehicle through a roadside unit (RSU).

6. The method of claim 4, in which the infrastructure network receives the sensor data from the selected sender vehicle through a base station.

7. The method of claim 1, in which the sensor data is shared with an infrastructure/cloud network.

8. The method of claim 1, in which the sensor data is shared with the receiver vehicle by the selected sender vehicle.

9. The method of claim 1, further comprising calculating a series of timeslots, positions, directions, lengths and angular widths of sectors of the sensor coverage area of the selected sender vehicle to capture the area of interest.

10. The method of claim 9, in which the selected sender vehicle calculates the series of timeslots, positions, directions, lengths and the angular widths of sectors of the sensor coverage area of the selected sender vehicle to capture the area of interest.

11. A non-transitory computer-readable medium having program code recorded thereon for partial sensor data sharing, the program code being executed by a processor and comprising:
    program code to detected an occluded area relative to a receiver vehicle;
    program code to define an area of interest (AoI) encompassing the detected occluded area based on a traffic topology and state information of a selected sender vehicle;
    program code to transmit the area of interest to the selected sender vehicle; and
    program code to receive a sensor data corresponding to the area of interest when the detected occluded area is within a sensor coverage area of the selected sender vehicle.

12. The non-transitory computer-readable medium of claim 11, further comprising:
    program code to define, by the receiver vehicle, the area of interest encompassing the detected occluded area;
    program code to set, by the receiver vehicle, a time window for partial data sharing by the selected sender vehicle; and
    program code to analyze, by the receiver vehicle, the detected occluded area based on the sensor data corresponding to the area of interest.

13. The non-transitory computer-readable medium of claim 11, in which the area of interest comprises specific sections of the sensor coverage area of the selected sender vehicle.

14. The non-transitory computer-readable medium of claim 11, further comprising:
    program code to define, by an infrastructure network, the area of interest;
    program code to select the selected sender vehicle based on received state information from potential sender vehicles;
    program code to set, by the infrastructure network, a time window for partial data sharing by the selected sender vehicle; and
    program code to receive, by the infrastructure network, the sensor data corresponding to the area of interest.

15. The non-transitory computer-readable medium of claim 11, further comprising:

- program code to calculate a series of timeslots, positions, directions, lengths and angular widths of sectors of the sensor coverage area of the selected sender vehicle to capture the area of interest.

* * * * *